US008702061B2

(12) United States Patent
Suzuki et al.

(10) Patent No.: US 8,702,061 B2

(45) Date of Patent: Apr. 22, 2014

(54) HYDRAULIC CIRCUIT FOR COUNTERWEIGHT ATTACHING/DETACHING DEVICE

(75) Inventors: Daisuke Suzuki, Tsuchiura (JP); Isao Oosato, Kasumigaura (JP); Hirokazu Shimomura, Tsuchiura (JP); Yoshinori Oowada, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 33 days.

(21) Appl. No.: 13/530,872

(22) Filed: Jun. 22, 2012

(65) Prior Publication Data

US 2013/0001492 A1 Jan. 3, 2013

(30) Foreign Application Priority Data

Jun. 30, 2011 (JP) ................................. 2011-145831

(51) Int. Cl.

| | |
|---|---|
| ***B60S 9/10*** | (2006.01) |
| ***B66F 3/24*** | (2006.01) |
| ***B66C 13/06*** | (2006.01) |
| ***B66C 13/54*** | (2006.01) |
| ***B60P 1/16*** | (2006.01) |

(52) U.S. Cl.
USPC ....... 254/93 VA; 212/270; 212/294; 298/22 C

(58) Field of Classification Search
USPC ............. 254/93 VA; 212/270, 294, 178, 181; 180/209, 89.14; 298/22 C, 22 J; 414/607, 666
See application file for complete search history.

(56) References Cited

U.S. PATENT DOCUMENTS

| | | | | | |
|---|---|---|---|---|---|
| 2,664,212 | A | * | 12/1953 | Gonne | 212/181 |
| 3,572,530 | A | * | 3/1971 | Ohntrup et al. | 414/666 |
| 3,726,416 | A | * | 4/1973 | Pottorff et al. | 212/178 |
| 3,734,223 | A | * | 5/1973 | Anderson | 180/294 |
| 3,891,095 | A | * | 6/1975 | Symmank | 212/178 |
| 3,941,252 | A | * | 3/1976 | Six et al. | 212/181 |
| 4,064,615 | A | * | 12/1977 | Andersson | 29/426.2 |
| 4,081,081 | A | * | 3/1978 | Morrow et al. | 212/178 |
| 4,401,179 | A | * | 8/1983 | Anderson | 180/89.14 |
| 4,579,234 | A | * | 4/1986 | Delago et al. | 212/178 |
| 5,005,714 | A | * | 4/1991 | Kroll et al. | 212/196 |
| 5,484,069 | A | * | 1/1996 | Lanning | 212/270 |
| 5,536,150 | A | * | 7/1996 | Tucker | 417/390 |
| 5,816,354 | A | * | 10/1998 | Watkins | 180/209 |
| 5,904,218 | A | * | 5/1999 | Watkins | 180/209 |
| 5,960,970 | A | * | 10/1999 | Walker | 212/294 |
| 6,551,050 | B1 | * | 4/2003 | Kallevig et al. | 414/607 |
| 6,702,132 | B1 | * | 3/2004 | Moore et al. | 212/270 |
| 7,523,994 | B2 | * | 4/2009 | Jones | 298/22 J |
| 7,604,300 | B2 | * | 10/2009 | Whitfield, Jr. et al. | 298/22 C |
| 8,245,805 | B2 | * | 8/2012 | Mallan et al. | 180/89.14 |

FOREIGN PATENT DOCUMENTS

| | | | |
|---|---|---|---|
| JP | 07-268908 | A | 10/1995 |
| JP | 2922778 | B2 | 4/1999 |

* cited by examiner

*Primary Examiner* — Alvin Grant

(74) *Attorney, Agent, or Firm* — Mattingly & Malur, PC

(57) ABSTRACT

A first cutoff valve is disposed in a main duct ranging between a control valve and a bottom chamber of a hydraulic cylinder. A sequence valve in the first cutoff valve is disposed along such a direction as to control outflow of a hydraulic fluid from the bottom chamber and the hydraulic pressure in a rod chamber is applied to the sequence valve as an external pilot pressure. A second cutoff valve is disposed in a main duct ranging between the control valve and the rod chamber of the hydraulic cylinder. A sequence valve in the second cutoff valve, disposed along such a direction as to control outflow of the hydraulic fluid from the rod chamber, and the hydraulic pressure in the rod chamber is applied to the sequence valve as an internal pilot pressure.

8 Claims, 7 Drawing Sheets

HYDRAULIC CIRCUIT FOR COUNTERWEIGHT ATTACHING/DETACHING DEVICE

BACKGROUND OF THE INVENTION

1. Field of the Invention

The present invention relates to a hydraulic circuit in a device that attaches/detaches a counterweight to/from the rear portion of the body of a work machine such as a hydraulic excavator, a wrecking machine or a crane.

2. Description of the Related Art

At a work machine such as a hydraulic excavator, a wrecking machine or a crane, a work device engaged in excavating operation, crushing operation, loading operation or the like is attached to the front portion of the work machine body and a counterweight is mounted at the rear side of the work machine body so as to balance the weight of the work device. As a given work device is replaced with another work device, the counterweight may need to be switched to a counterweight with optimal weight for the type of operation to be performed by the new work device or the weight of the new work device. Or an additional counterweight may need to be mounted or part of the existing counterweight may need to be detached so as to suit the type of operation to be performed by the new work device or the weight of the new work device. In addition, when the work machine is to be transported to another location, the counterweight will need to be separated from the work machine and moved to the new location to be reassembled at the new work site. In other words, the counterweight needs to be attached to and detached from the work machine body frequently. The counterweight attaching/detaching devices in the related art include, for instance, that disclosed in Japanese Patent No. 2922778.

The counterweight attaching/detaching device disclosed in Japanese Patent No. 2922778 comprises a hydraulic cylinder used to raise/lower a counterweight, which is mounted at the rear portion of the work machine body so as to be allowed to swing up/down, a swing arm attached to the rear portion of a work machine body, which swings up/down as the hydraulic cylinder extends/retracts, and a link member suspended from the front end of the swing arm and connected to the counterweight. When attaching the counterweight to the work machine body, the swing arm is lowered by retracting the hydraulic cylinder, the link member is connected to the counterweight placed on the ground, then the counterweight is lifted to the work machine body by extending the hydraulic cylinder and thus raising the swing arm and finally the counterweight is locked to the work machine body with a bolt.

After the counterweight has been lifted to the work machine body and locked to the work machine body as described above, the hydraulic cylinder is slightly retracted so as to perform work by achieving an unconstrained state in which the hydraulic cylinder, the swing arm and the link member are not subjected to the load attributable to the counterweight. In such an unconstrained state, the force imparted from the counterweight side is not transmitted to the link member, the swing arm or the hydraulic cylinder. The unconstrained state is achieved by slightly retracting the hydraulic cylinder after attaching the counterweight to the work machine body as described above, in order to prevent any damage to crucial parts of the attaching/detaching device, such as breakage of the linking bolt used at the link member, due to vibration transmitted to the counterweight from the body of the work machine during the operation, which would otherwise be transmitted to the link member, the swing arm and the like.

Such a counterweight attaching/detaching device in the related art may include a hydraulic circuit such as that shown in FIG. 7. In FIG. 7, reference numeral 25 indicates a hydraulic cylinder that raises/lowers the counterweight (not shown), reference numerals 50 and 51 respectively indicate a main hydraulic pump and a pilot hydraulic pump both mounted at the work machine body and reference numeral 53 indicates a control valve that is switched via a pilot valve 54. Reference numeral 56 indicates a main duct connecting a bottom chamber 25*a* at the hydraulic pump 25 and the control valve 53. At the main duct 56, a slow return valve 58, a pressure sensor 70, a stop valve 71, which remains closed as long as the counterweight attaching/detaching device is not engaged in operation, and a pilot-operated check valve 72 are disposed. The pilot-operated check valve 72 prevents the fluid in the bottom chamber 25*a* from flowing out of the bottom chamber 25*a* while the hydraulic cylinder 25 is not in operation, whereas it achieves continuity with the hydraulic pressure in a main duct 57 located on the side where a rod chamber 25*b* is present, applied thereto as a pilot pressure when the hydraulic cylinder 25 retracts.

As described earlier, once the counterweight is locked to the work machine body, the counterweight attaching/detaching device sets the hydraulic cylinder in the unconstrained state by displacing the hydraulic cylinder to a position at which the load of the counterweight is not applied to the cylinder and the like. However, the hydraulic circuit for the counterweight attaching/detaching device in the related art includes the pilot-operated check valve 72 which prevents the counterweight from falling down, disposed so as to block the main duct 56. Thus, an oil chamber sealed with the pilot-operated check valve 72 is formed over the circuit area ranging from the pilot-operated check valve 72 through the bottom chamber 25*a*. Under such conditions, the hydraulic fluid in the hydraulic cylinder 25 repeatedly contracts and expands as heat is radiated from the engine or the like or as the outside air temperature changes. Then, as thermal expansion of the hydraulic fluid causes the hydraulic cylinder 25 to extend, the hydraulic cylinder 25 can no longer be held in the unconstrained state. Instead, it enters a constrained state in which the counterweight, locked to the work machine body with the bolt, is subjected to an upward force. Under the load of an excessive upward force, crucial parts such as the hydraulic cylinder and the link member may become damaged.

Since thermal expansion of the hydraulic fluid could lead to damage to crucial parts of the counterweight attaching/detaching device, as described above, a pressure sensor 70 is disposed in the main duct 56 connected to the bottom chamber of the hydraulic cylinder 25 in the related art. Namely, as the pressure sensor 70 detects an abnormal pressure, the operator is notified. The operator, having been notified of the abnormal increase in pressure, operates the control valve 53 for the hydraulic cylinder so as to retract the hydraulic cylinder 25, thereby preventing damage to crucial parts such as the hydraulic cylinder 25 and the link. However, since the operator, having been warned of the abnormality via the pressure sensor 70, needs to halt the operation of the work machine and adjust the hydraulic cylinder 25 to the optimal position, work efficiency will be compromised.

BRIEF SUMMARY OF THE INVENTION

An object of the present invention, having been completed by addressing the issues discussed above, is to provide a hydraulic circuit for a counterweight attaching/detaching device with which damage to crucial parts due to thermal expansion of the hydraulic fluid in the hydraulic cylinder used to raise/lower the counterweight, can be prevented without having to halt operation of the work machine.

The hydraulic circuit for a counterweight attaching/detaching device according to the present invention, comprising:

a work machine body at which a hydraulic source is disposed, a counterweight detachably mounted at the work machine body, an up/down hydraulic cylinder attached to the work machine body, which raises/lowers the counterweight so as to attach/detach the counterweight to/from the work machine body by delivering/discharging a hydraulic fluid, originating from the hydraulic source, to/from a bottom chamber and a rod chamber; and a control valve disposed between the hydraulic source and the up /down hydraulic cylinder, characterized in that it further includes:

a first cutoff valve configured with a sequence valve to which hydraulic pressure in the rod chamber is applied as an external pilot pressure disposed in a first main duct located between the control valve and the bottom chamber of the up/down hydraulic cylinder, along such a direction as to control outflow of hydraulic fluid from the bottom chamber, and a check valve connected in parallel to the sequence valve; and a second cutoff valve configured with a sequence valve that achieves continuity with the hydraulic pressure in the rod chamber applied thereto as an internal pilot pressure higher than the external pilot pressure at which the sequence valve in the first cutoff valve achieves continuity, disposed in the second main duct located between the control valve and the rod chamber of the up/down hydraulic cylinder, along such a direction as to control outflow of the hydraulic fluid from the rod chamber and a check valve connected in parallel to the sequence valve.

When the counterweight is locked to the work machine body with a bolt and the up/down hydraulic cylinder is in an unconstrained state, i.e., the up/down hydraulic cylinder is not constrained by the counterweight, both the bottom chamber and the rod chamber in the up/down hydraulic cylinder in the hydraulic circuit according to the present invention each turn into a sealed oil reservoir. Thus, as the fluid in the bottom chamber and the rod chamber thermally expands, the hydraulic pressures in the bottom chamber and the rod chamber in the hydraulic circuit rise. Since the hydraulic pressure in the rod chamber in the hydraulic circuit according to the present invention is applied to the operating portion of the sequence valve at the first cutoff valve as an external pilot pressure, the thermal expansion of the fluid causes the sequence valve in the first cutoff valve to open so as to prevent the hydraulic cylinder from extending by partially releasing the fluid in the bottom chamber. In other words, since the counterweight remains unconstrained instead of reverting to the constrained state due to extension of the hydraulic cylinder caused by thermal expansion of the fluid therein and thus the hydraulic cylinder or the link member is not subjected to an excessive force, damage to the hydraulic cylinder or the link member is effectively prevented.

As the fluid flows out of the bottom chamber due to thermal expansion of the fluid within the hydraulic cylinder while the counterweight is locked to the work machine body with the bolt, as has been explained earlier, the hydraulic cylinder retracts. As the hydraulic cylinder continues to retract and the hydraulic cylinder becomes constrained along a direction in which the counterweight is pressed down, the hydraulic pressure in the rod chamber rises. Since the hydraulic pressure in the rod chamber is applied to the sequence valve in the second cutoff valve as an internal pilot pressure as explained earlier, the increase in the hydraulic pressure in the rod chamber in this situation causes the sequence valve in the second cutoff valve to open, resulting in a decrease in the hydraulic pressure in the rod chamber. Thus, the retraction of the hydraulic cylinder does not generate an excessive force and consequently, crucial parts such as the hydraulic cylinder and the link member remain undamaged.

In addition, since the outflow of the fluid from the bottom chamber or the rod chamber occurs automatically, the operator does not need to halt the operation in order to adjust the extent to which the hydraulic cylinder extends and thus, better work efficiency is assured.

The hydraulic circuit for a counterweight attaching/detaching device according to the present invention is further characterized in that it includes an internal pilot duct disposed at a sequence valve in the first cutoff valve, through which the hydraulic pressure in the bottom chamber is applied to the sequence valve in the first cutoff valve as an internal pilot pressure and that the internal pilot pressure that causes the sequence valve to achieve continuity is set at a bottom chamber hydraulic pressure at which the counterweight can be supported by the hydraulic cylinder.

In a hydraulic circuit that includes an internal pilot duct through which the hydraulic pressure in the bottom chamber is applied to the sequence valve in the first cutoff valve as an internal pilot pressure set at a value at which the counterweight can be supported, a single valve, i.e., the first cutoff valve, is allowed to achieve continuity at two different pilot pressures. Such a hydraulic circuit structure, which does not require two valves to achieve continuity at two different pilot pressures, thus allows the device to be provided as a more compact unit.

As an alternative, the hydraulic circuit for a counterweight attaching/detaching device according to the present invention may be further characterized in that an external pilot duct is disposed at the sequence valve in the second cutoff valve and that the sequence valve is allowed to achieve continuity with an external pilot pressure for the sequence valve supplied through the external pilot duct when the hydraulic cylinder is engaged in operation.

In the hydraulic circuit in which the external pilot duct is disposed at the sequence valve in the second cutoff valve so as to allow the sequence valve to achieve continuity with the external pilot pressure applied through the external pilot duct as the hydraulic cylinder is engaged in operation as described above, a single valve, i.e., the second cutoff valve, instead of two valves, achieves continuity at two different pilot pressures. The device can be provided as a more compact unit by adopting such a hydraulic circuit structure.

The hydraulic circuit for a counterweight attaching/detaching device according to the present invention may be further characterized in that the hydraulic circuit includes a duct, through which the fluid in the rod chamber can be discharged into a fluid tank and that a stop valve is disposed at the duct.

By setting the stop valve, disposed in the duct through which the fluid in the rod chamber can be discharged into the fluid tank, in an open state while the work machine is being transported without the counterweight attached thereto, it is ensured that the hydraulic pressure in the rod chamber does not rise even if thermal expansion occurs in the fluid in the bottom chamber while the work machine is being transported without the counterweight attached thereto and thus, the risk of the first cutoff valve opening to allow the fluid in the bottom chamber to be discharged into the fluid tank is averted.

Namely, since retraction of the hydraulic cylinder due to discharge of the fluid from the bottom chamber of the hydraulic cylinder does not occur, it is ensured that the hydraulic cylinder does not pressed against another device to damage the other device while the work machine is being transported without the counterweight attached thereto.

DETAILED DESCRIPTION OF THE INVENTION

Figure 1:
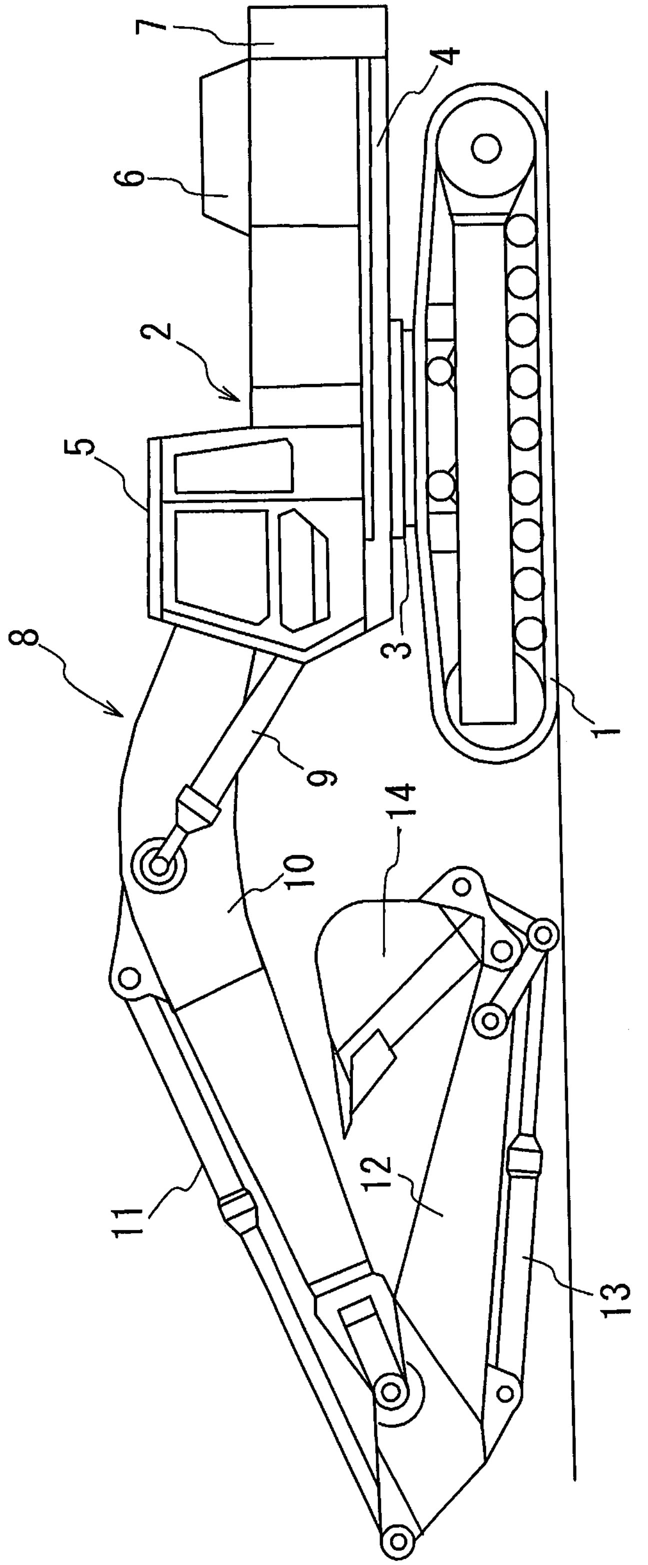
FIG. 1 is a side elevation of a work machine in which the hydraulic circuit for a work machine counterweight attaching/detaching device according to the present invention may be adopted.

FIG. 1 is a side elevation of a work machine in which the hydraulic circuit for a counterweight attaching/detaching device according to the present invention may be adopted. The work machine in this example is a hydraulic excavator. Reference numeral 1, reference numeral 2 and reference numeral 4 in FIG. 1 respectively indicate a traveling lower superstructure, an revolving upper superstructure (work machine body) rotatably installed via a revolving device 3, upon the traveling lower superstructure 1, and a revolving frame that is used as the frame for the revolving upper superstructure 2. At the revolving frame 4, an operator's cab 5 and a machine room 6, configured as a hydraulic power unit that includes a prime motor and a hydraulic pump, are mounted. A counterweight 7 is attached to a rear portion of the revolving frame 4, whereas a work device 8 is attached to a front part of the revolving frame. The counterweight 7 is mounted so as to balance the weight of the work machine as a whole relative to the weight of the work device 8 or the like.

The work device 8 comprises a boom 10 attached to the front portion of the revolving frame 4 so that it can be moved up/down via a boom cylinder 9, an arm 12 attached to the front end of the boom 10 so that the arm 12 can be made to swing via an arm cylinder 11, and a bucket 14 attached to the front end of the arm 12 so that the bucket 14 can be made to swing via a bucket cylinder 13.

Figure 2:
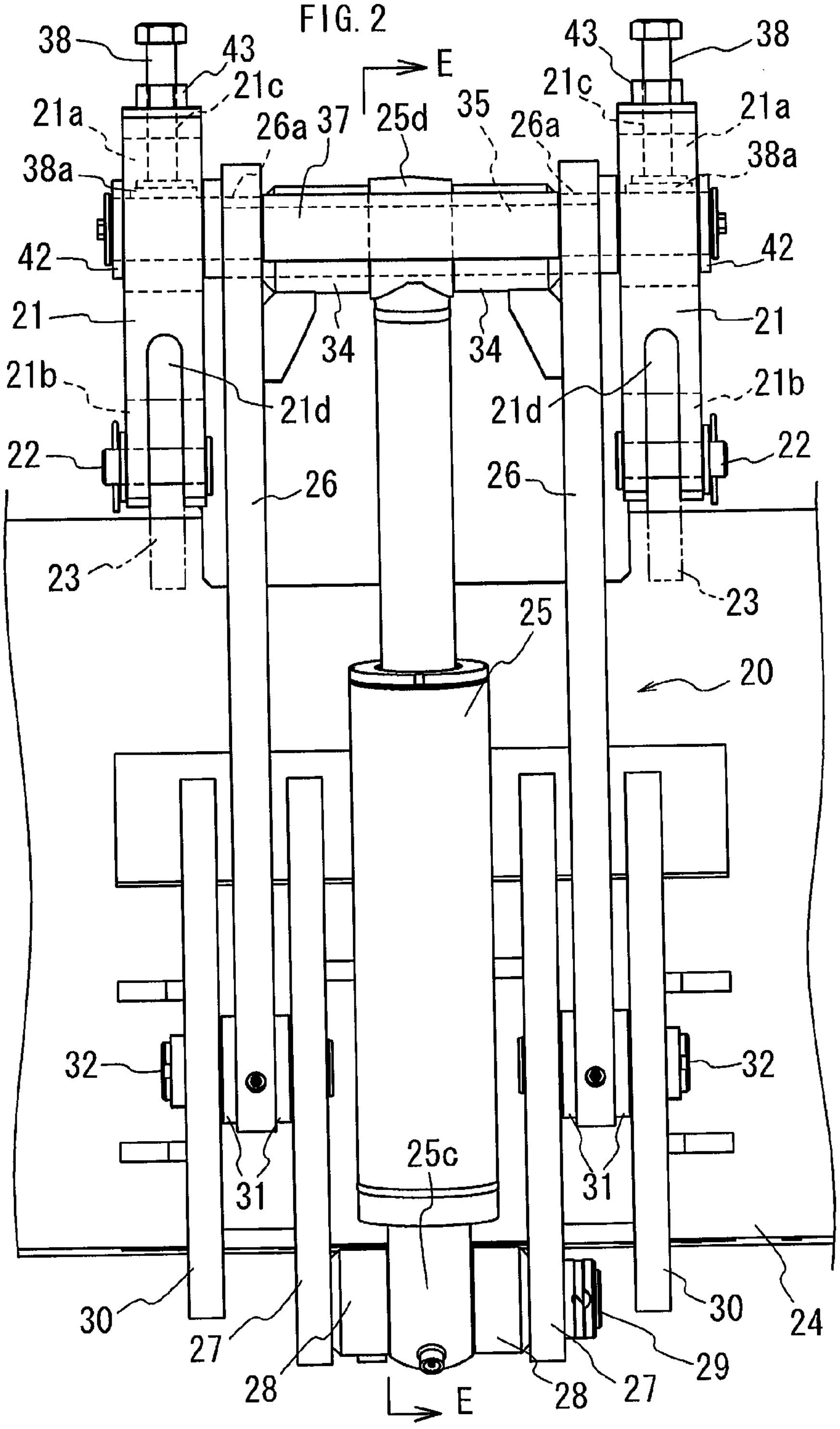
FIG. 2 is a rear view of a counterweight attaching/detaching device in which the hydraulic circuit for a counterweight attaching/detaching device according to the present invention may be adopted.
Figure 3:
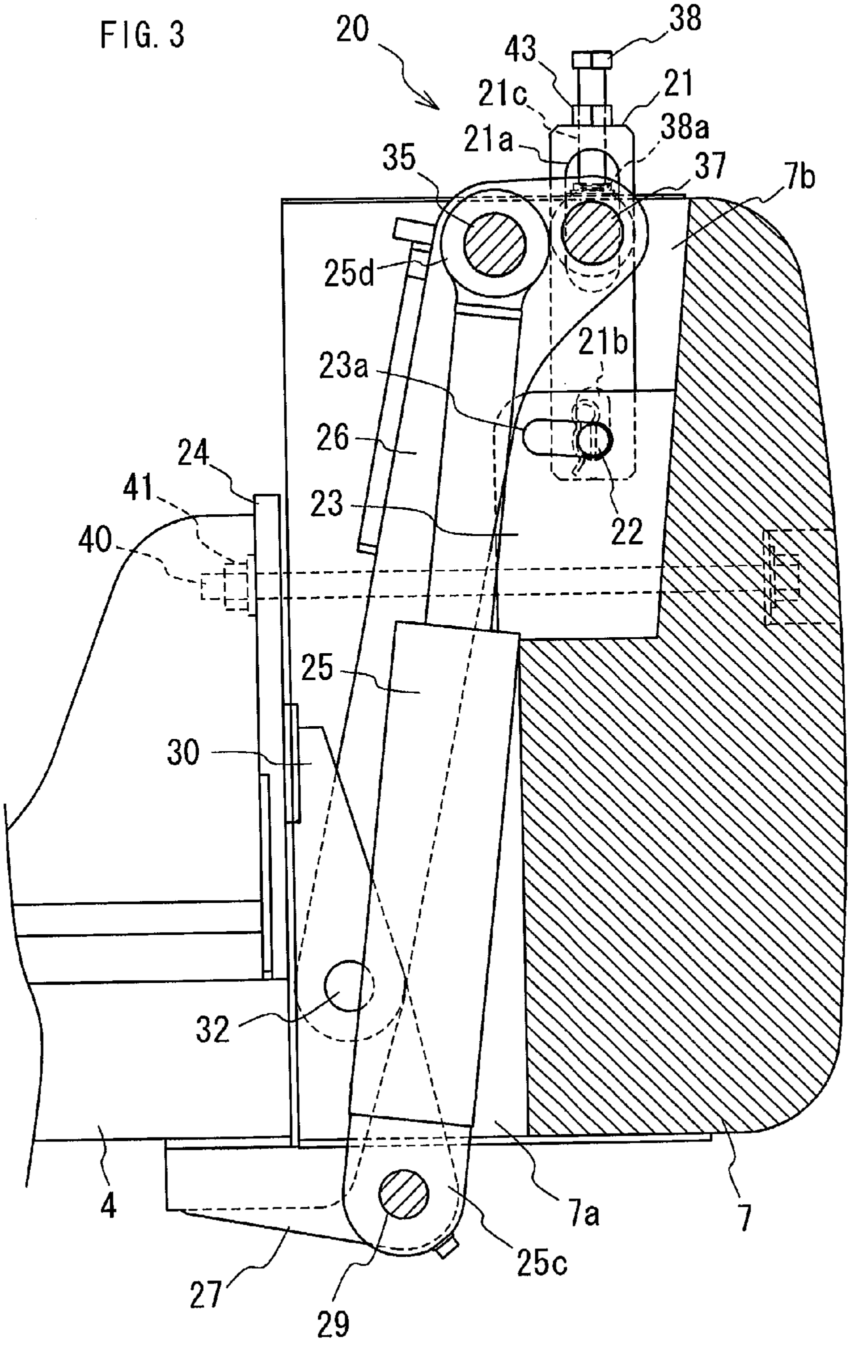
FIG. 3 is a sectional view taken along E-E in FIG. 2.
Figure 4:
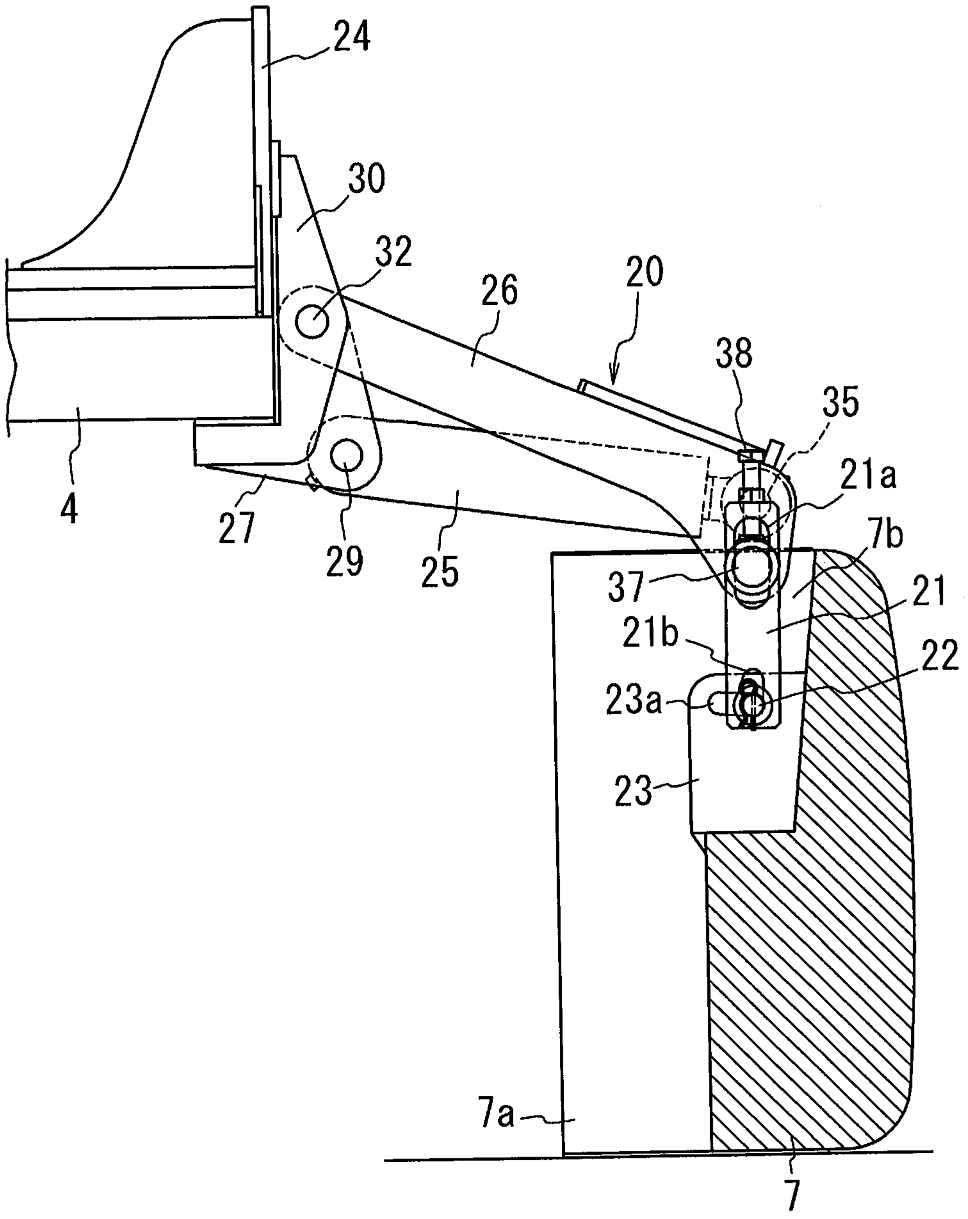
FIG. 4 is a side elevation of the counterweight attaching/detaching device with its link members connected to a counterweight placed on the ground.
Figure 5:
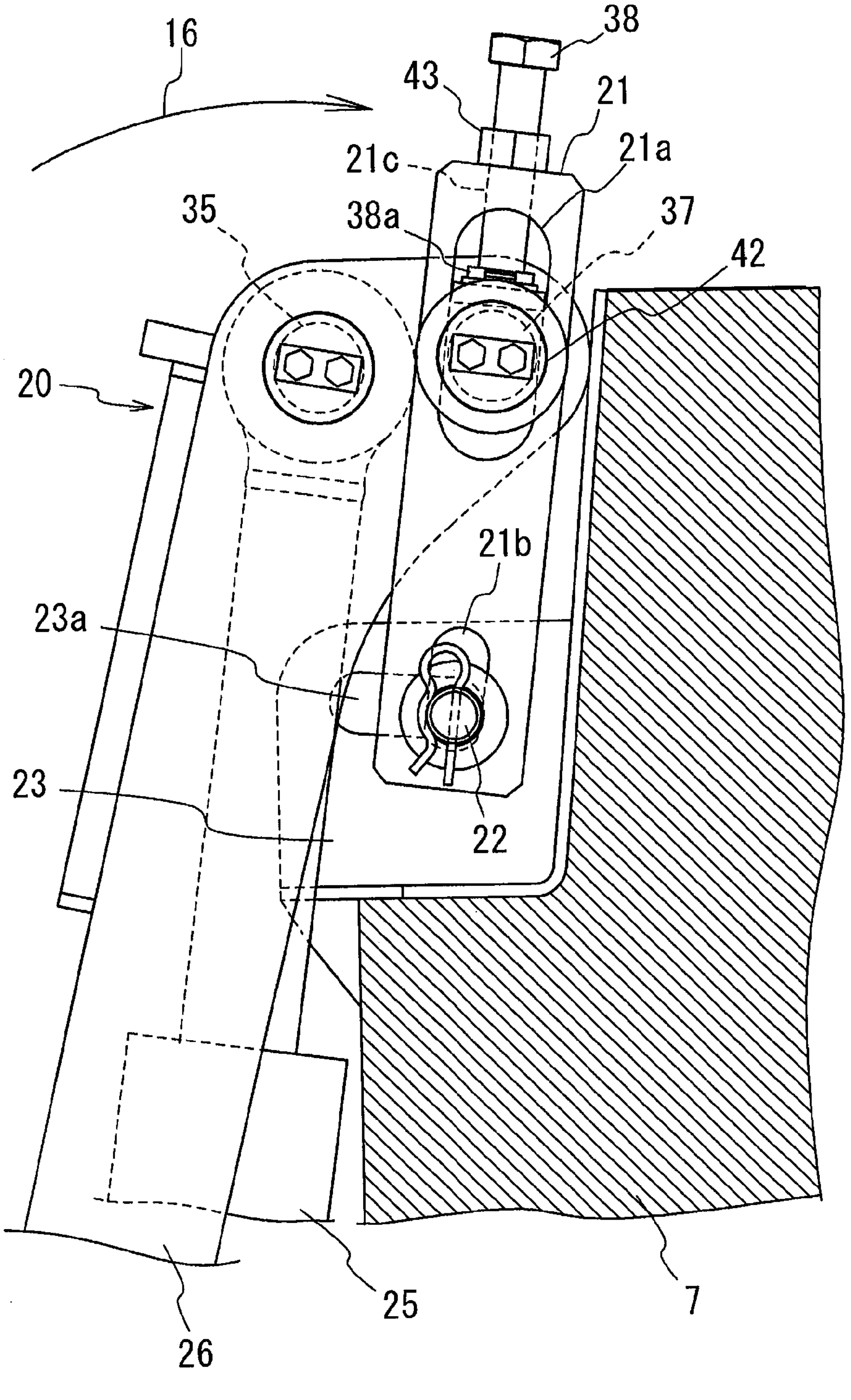
FIG. 5 is a side elevation of the counterweight attaching/detaching device in an unconstrained state achieved by slightly retracting the up/down hydraulic cylinder after attaching the counterweight to the work machine body.

FIG. 2 is a rear view of a counterweight attaching/detaching device in which the hydraulic circuit according to the present invention may be adopted, FIG. 3 is a sectional view taken along E-E in FIG. 2, FIG. 4 is a side elevation of the counterweight attaching/detaching device with its link member connected to a counterweight placed on the ground, and FIG. 5 is a side elevation of the counterweight attaching/detaching device with a hydraulic cylinder set in an unconstrained state. Reference numerals 4 and 24 in FIGS. 3 and 4 respectively indicate the revolving frame and a counterweight abutting plate formed as an integrated part of the rear end of the revolving frame 4. The abutting plate 24 has a width equal to the width of the counterweight 7 measured along the left-right direction. With the front surface of the counterweight 7 abutted to the abutting plate 24, the counterweight 7 is locked to the revolving frame 4 via a bolt 40 passing through the counterweight 7 and a nut 41 (see FIG. 3) interlocking with the bolt 40.

Reference numeral 20 indicates the counterweight attaching/detaching device, which is disposed at the rear end of the revolving frame 4 constituting part of the revolving upper superstructure 2. As shown in FIG. 3, a recess 7*a*, in which the counterweight attaching/detaching device 20 is to be housed is formed at the front surface of the counterweight 7 so that the space created by the recess 7*a* ranges from the top through the bottom of the counterweight 7. The top part of the recess 7*a* forms a recess 7*b* widening toward the rear. At the bottom surface of the widened recess 7*b*, a pair of linking plates 23 are attached through welding or via bolts. Each of a pair of link members 21, to be described in detail later, included in the counterweight attaching/detaching device 20, is detachably connected with a pin 22 via a pin hole 23*a* formed at each linking plate 23. In order to set a hydraulic cylinder 25 in the unconstrained state by slightly retracting the hydraulic cylinder 25, as shown in FIG. 5, the pin holes 23*a* are formed as elongated holes elongated along the front-rear direction and are made to slope downward toward the rear.

The counterweight attaching/detaching device 20 is configured with the up/down hydraulic cylinder 25, swing arms 26 and the link members 21. The swing arms 26 are movable members that convert the extension/retraction of the hydraulic cylinder 25 to up/down motion. The link members 21 are attached to the free ends of the swing arms 26.

As shown in FIG. 2, brackets 27 and 27 are attached through welding to a central area of the abutting plate 24, located around the center thereof assumed along the left-right direction. A boss 25*c*, located at the bottom-side end of the hydraulic cylinder 25, is inserted between the brackets 27 and 27 via tubular spacers 28 and 28, and then, a center pin 29 is inserted through pin holes at the brackets 27 and 27, the spacers 28 and 28 and the boss 25*c* at the bottom-side end. The hydraulic cylinder 25 is allowed to swing up/down around this center pin 29.

The counterweight attaching/detaching device 20 includes a total of two swing arms 26, one disposed on the left side of the hydraulic cylinder 25 and the other disposed on the right side of the hydraulic cylinder 25. The swing arms 26 are mounted via brackets 30, each welded to the outer side of one of the brackets 27 disposed on the left side and on the right side at the abutting plate 24. The base portion of each swing arm 26 is held via a ring-shaped spacer 31, between one of the brackets 27 and the corresponding bracket 30, and a center pin 32 is inserted through pin holes formed at the brackets 27 and 30 at the spacer 31 and a pin hole formed at the base portion of the swing arm 26. As a result, the swing arms 26 are each attached so as to be allowed to swing, centered on the corresponding center pin 32. The center pins 32 for the left swing arm 26 and the right swing arm 26 assume equal heights and are concentric to one another. In addition, the center pins 32 for the swing arms 26 are disposed at a position higher than that taken up by the center pin 29 for the hydraulic cylinder 25.

A boss 25*d* at the piston rod front end of the hydraulic cylinder 25 is held between the free ends of the swing arms 26 and 26 via tubular spacers 36 and 36 and is connected to the front ends of the swing arms 26 and 26 via a link member pin 35 inserted at the boss 25*d*, tubular spacers 34 and 34 and pin holes formed at the free ends of the swing arms 26 and 26.

A pin 37, used when attaching the link members 21, is attached to the free ends of the swing arms 26 and 26 so as to pass through pin holes 26*a* and 26*a* formed at the swing arms 26 and 26. At the top and the bottom of each link member 21, pin holes 21*a* and 21*b*, each elongated along the top-bottom direction, are formed. The two ends of the pin 37 are made to project out beyond the swing arms 26 and 26, and the two projecting ends are inserted through the top pin holes 21*a* at the link members 21 so that the two ends are allowed to move up/down. A retainer 42 is attached to each of the two end surfaces of the pin 37 so as to prevent the corresponding link member 21 from detaching itself from the pin 37. The link members 21 each include a threaded hole 21*c* formed at the top thereof, and a bolt 38 interlocked at the threaded hole 21*c*, passes through the threaded hole 21*c* until it reaches the pin hole 21*a*.

Toward the bottom of each link member 21, a groove 21*d* is formed so as to pass through the link member 21 along the front-rear direction with a lower end thereof being an open end. The counterweight 7 is detachably connected to the link members 21 by inserting the linking plates 23, disposed at the counterweight 7 through the individual grooves 21*d* and detachably inserting the pins 22 through the pin holes 23*a* formed at the linking plates 23 and the pin holes 21*b* formed at the link members 21.

A nut 43 and a bolt 38 are locked to each link member 21 with the nut 43, interlocking with the bolt 38, fastened by adjusting the depth to which the bolt 38 is screwed into a threaded hole 21*c*. A contact piece 38*a* fixed to the lower end of the bolt 38 is placed in contact with the upper surface of the pin 37. The distance between the pin 37 and the pins 22, measured along the top/bottom direction as the counterweight 7 is suspended, can be adjusted by altering the depth to which the bolts 38 are screwed into the link members 21. By adopting the structure whereby the contact pieces 38*a* at the lower ends of the bolts 38 are set in contact with the upper surface of the pin 37 as described above, it is ensured that the bolts 38 are not subjected to any bending force and thus are protected from damage.

The counterweight 7 is attached via this counterweight attaching/detaching device, as illustrated in FIG. 4. Namely, the swing arms 26 are lowered by causing the hydraulic cylinder 25 to retract so as to connect, via the pins 22, the link members 21 with the linking plates 23 at the counterweight 7 placed on the ground. Subsequently, the hydraulic cylinder 25 is caused to extend so as to swing the swing arms 26 around the center pins 32 thereby lifting the counterweight 7. Then, the front surface of the counterweight 7 is abutted against the abutting plate 24, as illustrated in FIG. 3 and the counterweight 7 is locked to the revolving frame 4 via a bolt 40 and a nut 41.

Subsequently, the hydraulic cylinder 25 is caused to retract slightly so as to swing the swing arms 26 as indicated by an arrow 16 and an unconstrained state, in which the hydraulic cylinder 25 is subjected to no load, is achieved by lowering the link members 21, as shown in FIG. 5. In this unconstrained state, the hydraulic cylinder 25 is not under the load of the counterweight 7 and thus, tension attributable to the counterweight 7 does not occur at the link members 21. The counterweight 7 can be detached from the revolving frame 4 and lowered to the ground through a procedure that is the reverse of the procedure described above.

Figure 6:
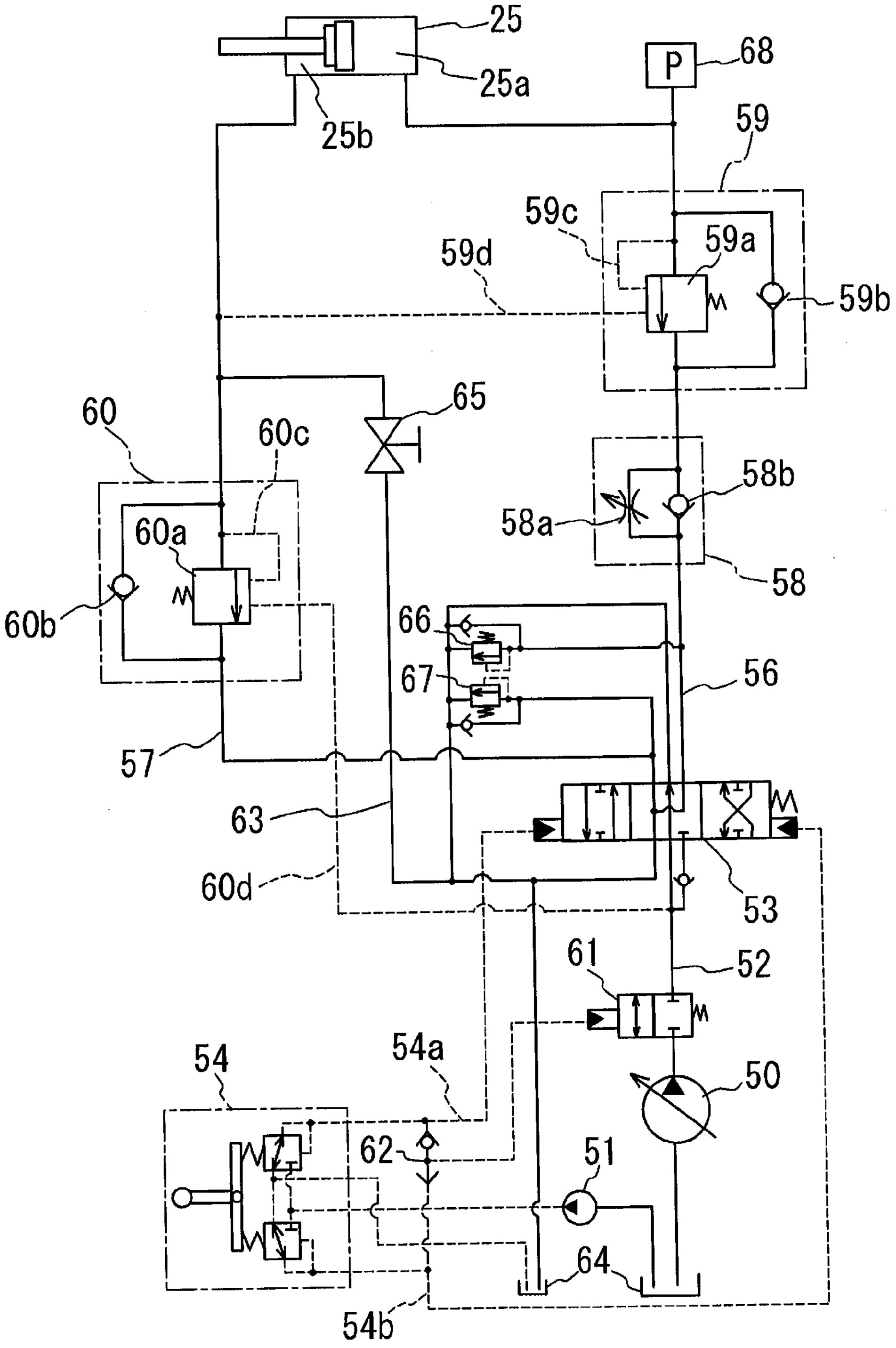
FIG. 6 is a hydraulic circuit diagram pertaining to an embodiment of the hydraulic circuit for a counterweight attaching/detaching device according to the present invention.
Figure 7:
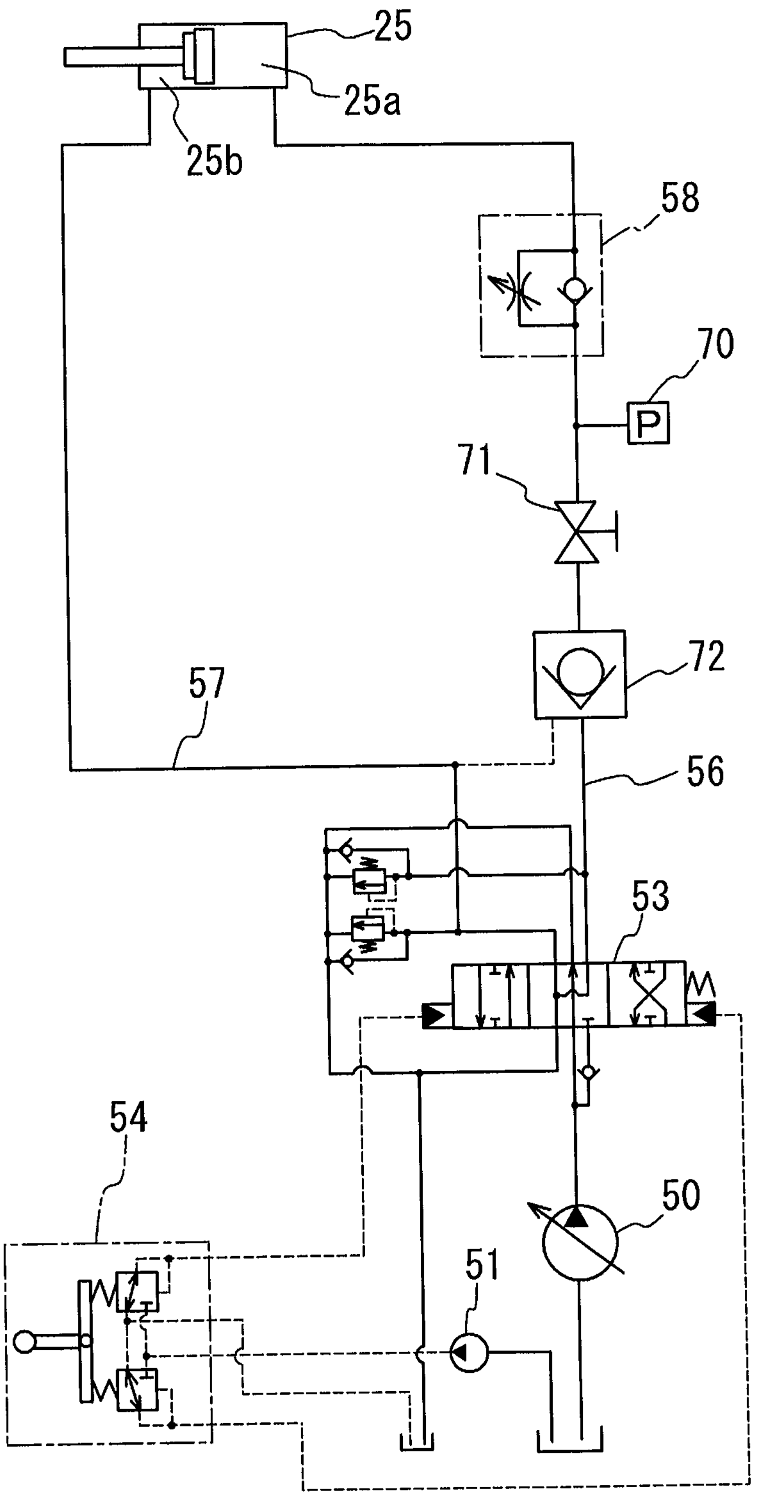
FIG. 7 PRIOR ART
FIG. 7 is a hydraulic circuit diagram pertaining to a hydraulic circuit for a counterweight attaching/detaching device in the related art.

FIG. 6 is a hydraulic circuit diagram pertaining to an embodiment of the hydraulic circuit for a counterweight attaching/detaching device according to the present invention. Reference numerals 50 and 51 in FIG. 6 respectively indicate a main hydraulic pump and a pilot hydraulic pump installed in the machine room 6 as a hydraulic source. Reference numeral 53 indicates a control valve for the up/down hydraulic cylinder 25 disposed in an outlet duct 52 of the main hydraulic pump 50. The control valve 53, mounted on the revolving frame 4, is used as an auxiliary control valve. Reference numeral 54 indicates a pilot valve for the control valve 53, which is operated via an operation lever installed in the operator's cab 5.

Reference numeral 56 indicates a first main duct disposed between a bottom chamber 25*a* of the up/down hydraulic cylinder 25 and the control valve 53, whereas reference numeral 57 indicates a second main duct disposed between a rod chamber 25*b* of the up/down hydraulic cylinder 25 and the control valve 53. Reference numeral 58 indicates a slow-return valve disposed in the first main duct 56 and reference numeral 59 indicates a first cutoff valve installed in the first main duct 56, which is connected in series to the slow return valve 58. The slow return valve 58 is configured with a variable throttle valve 58*a* used to prevent a sudden retraction of the hydraulic cylinder 25, which would otherwise be caused by the load of the counterweight 7, as the counterweight 7 is lowered by retracting the hydraulic cylinder 25, and a check valve 58*b* connected in parallel to the variable throttle valve 58*a*.

The first cutoff valve 59 is configured with a sequence valve 59*a* disposed along such a direction as to control the outflow of the hydraulic fluid from the bottom chamber 25*a* and a check valve 59*b* disposed in parallel to the sequence valve 59*a*. The hydraulic pressure in the bottom chamber 25*a* is applied via an internal pilot duct 59*c*, to the sequence valve 59*a* as a valve continuous-side internal pilot pressure, and also, the hydraulic pressure in the rod chamber 25*b* is applied to the sequence valve 59*a* via an external pilot duct 59*d* as a valve continuous-side external pilot pressure.

The internal pilot pressure at which the sequence valve 59*a* achieves continuity is set at a level higher than a hydraulic pressure at which the load of the counterweight 7 can be supported (e.g., 20 MPa). For instance, the internal pilot pressure may be set to 30 MPa. The external pilot pressure for the fluid inside the external pilot duct 59*d*, at which the sequence valve 59*a* achieves continuity, may be set to, for instance, approximately 6 MPa.

Reference numeral 60 indicates a second cutoff valve disposed in the second main duct 57. A second cutoff valve 60 is configured with a sequence valve 60*a* disposed along such a direction as to control the outflow of the hydraulic fluid from the rod chamber 25*b* and a check valve 60*b* disposed in parallel to the sequence valve 60*a*. The hydraulic pressure in the rod chamber 25*b* is applied via an internal pilot duct 60*c* to the sequence valve 60*a* as an internal pilot pressure. The internal pilot pressure at which the sequence valve 60*a* achieves continuity may be set to 10 MPa. This pressure setting is higher than the pressure (e.g., 5 MPa) set for the external pilot duct 59*d* in correspondence to the sequence valve 59*a* in the first cutoff valve 59.

An external pilot duct 60*d* for the sequence valve 60*a* in the second cutoff valve 60 is connected to the secondary side of a switching valve 61 which is disposed in the outlet duct 52 of the main hydraulic pump 50. As a pilot pressure imparted via a shuttle valve 62, disposed between secondary-side pilot ducts 54*a* and 54*b* at the pilot valve 54, is applied to an operating portion of the switching valve 61, the switching valve 61 is switched from a cutoff position to a continuous position so as to allow the hydraulic fluid to be supplied from the main hydraulic pump 50 into the bottom chamber 25*a* or the rod chamber 25*b* via the control valve 53. The pilot pressure within the external pilot duct 60*d*, through which the sequence valve 50*a* is made to achieve continuity, should be set to, for instance, approximately 5 MPa.

Reference numeral 63 indicates a duct that converts the rod chamber 25*b* with a fluid tank 64, whereas reference numeral 65 indicates a stop valve disposed in the duct 63. The stop valve 65 is opened when transporting the work machine with the counterweight 7 detached so as to prevent the swing arms 26 from moving down. Reference numerals 66 and 67 each indicate a relief valve installed between the main duct 56 or 57 and a fluid tank 64. Via the relief valves 66 and 67, the maximum pressures in the main duct 56 and 57 are set. Reference numeral 68 indicates a pressure sensor via which the hydraulic pressure in the bottom chamber 25*a* is detected. Based upon a signal output from the pressure sensor, information indicating whether or not the hydraulic cylinder 25 is currently engaged in a counterweight raising/lowering operation is provided, via a lamp or the like, to the operator in the operator's cab. In addition, if the operator fails to set the hydraulic cylinder 25 in the unconstrained state after locking the counterweight 7 to the revolving frame 4, the operator is alerted to an increase in the hydraulic pressure inside the hydraulic cylinder 25 based upon the signal output from the pressure sensor.

When the hydraulic cylinder 25 is to be extended, the stop valve 65 in the hydraulic circuit is left in the closed state and the control valve 53 is switched to the left position by supplying pilot pressure fluid to the extension-side pilot duct 54*a* at the pilot valve 54. At the same time, as the pilot pressure fluid is delivered into the extension-side pilot duct 54*a*, pilot pressure fluid is also delivered into an operation chamber at the switching valve 61 through the shuttle valve 62 and, as a result, the switching valve 61 is switched to the continuous position. Thus, the hydraulic pressure in the pilot duct 60*d* rises, the sequence valve 60*a* in the second cutoff valve 60 opens and the pressure fluid from the main hydraulic pump 50 is supplied to the bottom chamber 25*a* via the control valve 53 and the check valves 58*b* and 59*b* in the first main duct 56. At the same time, the fluid in the rod chamber 25*b* is discharged into the fluid tank 64 through the sequence valve 60*a* in the second cutoff valve 60 and the control valve 53, causing the hydraulic cylinder 25 to extend.

When the hydraulic cylinder 25 is to be retracted, on the other hand, the stop valve 65 in the hydraulic circuit is left in the closed state and the control valve 53 is switched to the right position by supplying pilot pressure fluid to the retraction-side pilot duct 54*b* at the pilot valve 54. At the same time, as the pilot pressure fluid supplied from the pilot valve 54 into the pilot duct 54*b* is delivered into the operation chamber at the switching valve 61 through the shuttle valve 62 the switching valve 61 is switched to the continuous position. As a result, the pressure fluid from the main hydraulic pump 50 is delivered into the rod chamber 25*b* through the check valve 60*b* in the second cutoff valve 60. At the same time, the sequence valve 59*a* in the first cutoff valve 59 is opened with the pilot pressure fluid delivered into the operating portion of the sequence valve 59*a* in the first cutoff valve 59 via the pilot duct 59*d*. Consequently, the fluid in the bottom chamber 25*a* is discharged into the fluid tank 64 via the sequence valve 59*a* in the first cutoff valve 59, the variable throttle valve 58*a* and the control valve 53, thereby causing the hydraulic cylinder 25 to retract.

While the hydraulic cylinder 25 remains in the unconstrained state, as shown in FIG. 5, i.e., when the counterweight 7 is locked to the revolving frame 4 with the bolt 40 and the nut 41 (see FIG. 3) and the constraint on the hydraulic cylinder 25 imposed by the counterweight 7 is cleared by adjusting the hydraulic cylinder 25 in the most extended state to a slightly retracted state, the stop valve 65 is closed as in the case described above. Under this condition, the bottom chamber 25*a* and the duct extending from the bottom chamber 25*a* to the first cutoff valve 59 form a sealed oil reservoir. Likewise, the rod chamber 25*b* and the duct extending from the rod chamber 25*b* to the second cutoff valve 60 form a sealed oil reservoir.

In this state, if the fluid in the bottom chamber 25*a* and the rod chamber 25*b* thermally expands due to heat radiated from the engine or due to a high temperature where the work machine is engaged in operation, the hydraulic pressures in the bottom chamber 25*a* and the rod chamber 25*b* rise. It is to be noted that the cross sectional areas of the bottom chamber 25*a* and the rod chamber 25*b* are different and the hydraulic pressure in the rod chamber 25*b* is approximately twice that in the bottom chamber 25*a*. Then, as the hydraulic pressure in the rod chamber 25*b* rises to a level exceeding the external pilot pressure (e.g., 5 MPa set for the sequence valve 59*a* in the first cutoff valve 59, the sequence valve 59*a* is switched to the continuous position. As a result, the fluid in the bottom chamber 25*a* flows through the variable throttle valve 58*a* at the slow return valve 58. Some of the fluid flows out into the fluid tank 64 through the control valve 53 forming a closed circuit (a circuit in which the secondary-side main ducts 56 and 57 are shorted and the main ducts 56 and 57 are in communication with the fluid tank 64) at the neutral position, whereas the remaining fluid flows into the rod chamber 25*b* through the second main duct 57 and the check valve 60*b* in the second cutoff valve 60, thereby causing the hydraulic cylinder 25 to retract slightly. Since this prevents extension of the hydraulic cylinder 25 in spite of the thermal expansion, the hydraulic cylinder 25 remains unconstrained by the counterweight 7 and thus is not subjected to excessive force.

As thermal expansion of the hydraulic fluid during operation causes some of the fluid in the bottom chamber 25*a* to flow out, as described earlier, the hydraulic cylinder 25 may continuously retract and, as a result, the hydraulic cylinder 25 may enter a constrained state with a downward force imparted to the counterweight 7. Under such circumstances, hydraulic pressure in the rod chamber 25*b* will rise. As the hydraulic pressure in the rod chamber 25*b* continues to rise until it reaches a level matching the internal pilot pressure (e.g., 10 MPa) set for the sequence valve 60*a* in the second cutoff valve 60, the sequence valve 60*a* opens. As a result, some of the fluid in the rod chamber 25*b* is caused to flow out into the fluid tank 64 through the sequence valve 60*a* and the control valve 53 assuming the neutral position. Consequently, generation of any excessive force on the retraction side, too, is prevented and damage to crucial parts such as the hydraulic cylinder 25 and the link members 21 is prevented.

It is to be noted that if the operator, having lifted the counterweight 7 to the revolving frame 4 and locked the counterweight 7 to the abutting plate 24 with the bolt 40 and the nut 40, forgets to set the hydraulic cylinder 25 in the unconstrained state shown in FIG. 5, the hydraulic cylinder 25 remains constrained along the extending direction. In this case, while the hydraulic pressure in the bottom chamber 25*a* rises due to thermal expansion of the fluid in the bottom chamber 25*a*, the hydraulic pressure in the rod chamber 25*b* does not rise and thus, the sequence valve 59*a* in the first cutoff valve 59 is not switched to the continuous position.

Under such circumstances, a warning indicating that the constrained state has not been cleared is generated via a warning means located in the operator's cab if the hydraulic pressure in the bottom chamber 25_a_ reaches a specific level (e.g., 10 MPa) provided that the pilot valve 54 remains unoperated, so as to prompt the operator to set the hydraulic cylinder 25 in the unconstrained state. The reference hydraulic pressure (e.g., 10 MPa) for the bottom chamber, pertaining to which such a warning is issued, is set higher than 2.5 MPa, i.e., the bottom chamber-side hydraulic pressure corresponding to the pressure setting (e.g., 5 MPa) for the external pilot duct 59_d_, at which the sequence valve 59_a_ is opened on account of thermal expansion.

The present invention may be adopted in conjunction with a first cutoff valve 59, which includes a sequence valve made to achieve continuity based upon the pilot pressure in the external pilot duct 59_d_ and another sequence valve made to achieve continuity through the internal pilot duct 59_c_, disposed in parallel to each other. However, a single sequence valve 59_a_ with two pilot ducts 59_c_ and 59_d_, such as that in the embodiment, fulfills the functions of two sequence valves and contributes to miniaturization of the device.

In addition, the second cutoff valve 60, too, may include a sequence valve made to achieve continuity based upon the pilot pressure in the internal pilot duct 60_c_ and another sequence valve made to achieve continuity through the external pilot bucket 60_d_, disposed in parallel to each other. However, a single sequence valve 60 with two pilot ducts 60_c_ and 60_d_, such as that in the embodiment, fulfills the functions of two sequence valves and contributes to miniaturization of the device.

Furthermore, the structure achieved in the embodiment includes the duct 63, through which the fluid in the rod chamber 25_b_ can be discharged into the fluid tank 64 with the stop valve 65 disposed in the duct 63. While the work machine is being transported without any counterweight attached thereto, the stop valve 65 is set in a continuous state. Through these measures, the hydraulic pressure in the rod chamber 25_b_ is kept down so as to ensure that the sequence valve 59_a_ in the first cutoff valve 59 remains closed and that there is no risk of the fluid in the bottom chamber discharged into the fluid tank even if the fluid in the bottom chamber 25_a_ thermally expands while the work machine is being transported without any counterweight attached thereto. As a result, undesirable consequences, such as damage to another device caused by the hydraulic cylinder 25 having retracted due to discharge of the fluid in the bottom chamber 25_a_ contacting another device, are prevented.

While the invention has been particularly shown and described with respect to a preferred embodiment thereof by referring to the attached drawings, the present invention is not limited to this example and it will be understood by those skilled in the art that various changes in form and detail may be made therein without departing from the spirit, scope and teaching of the invention. For instance, the present invention may be adopted in conjunction with a non-revolving work machine body. In addition, the present invention may be adopted in a structure in which a sieve or a sprocket is moved up/down by extending/retracting an up/down hydraulic cylinder and a counterweight is raised/lowered by connecting the counterweight to a cable (movable member) attached to the sieve or a chain (movable member) attached to the sprocket.

What is claimed is:

1. A hydraulic circuit for a counterweight attaching/detaching device, comprising:

a work machine body at which a hydraulic source is disposed, a counterweight detachably mounted at said work machine body, an up/down hydraulic cylinder attached to said work machine body, which raises/lowers said counterweight so as to attach/detach said counterweight to/from said work machine body by delivering/discharging a hydraulic fluid, originating from said hydraulic source, to/from a bottom chamber and a rod chamber; and a control valve disposed between said hydraulic source and said up/down hydraulic cylinder, further comprising:

a first cutoff valve configured with a sequence valve to which a hydraulic pressure in said rod chamber is applied as an external pilot pressure, disposed in a first main duct located between said control valve and said bottom chamber of said up/down hydraulic cylinder, along such a direction as to control outflow of hydraulic fluid from said bottom chamber, and a check valve connected in parallel to said sequence valve; and a second cutoff valve configured with a sequence valve that achieves continuity with the hydraulic pressure in said rod chamber applied thereto as an internal pilot pressure higher than said external pilot pressure at which said sequence valve in said first cutoff valve achieves continuity, disposed in a second main duct, located between said control valve and said rod chamber of said up/down hydraulic cylinder, along such a direction as to control outflow of hydraulic fluid from said rod chamber, and a check valve connected in parallel to said sequence valve.

2. A hydraulic circuit for a counterweight attaching/detaching device according to claim 1, wherein:

an internal pilot duct through which the hydraulic pressure in said bottom chamber is applied to said sequence valve in said first cutoff valve as said internal pilot pressure, is disposed at said sequence valve in said first cutoff valve; and said internal pilot pressure at which said sequence valve achieves continuity is set at a bottom chamber hydraulic pressure at which said counterweight can be supported by said hydraulic cylinder.

3. A hydraulic circuit for a counterweight attaching/detaching device according to claim 1, wherein:

an external pilot duct is disposed at said sequence valve in said second cutoff valve; and said sequence valve is made to achieve continuity with an external pilot pressure for said sequence valve supplied through said external pilot duct when said hydraulic cylinder is engaged in operation.

4. A hydraulic circuit for a counterweight attaching/detaching device according to claim 2, wherein:

an external pilot duct is disposed at said sequence valve in said second cutoff valve; and said sequence valve is made to achieve continuity with an external pilot pressure for said sequence valve supplied through said external pilot duct when said hydraulic cylinder is engaged in operation.

5. A hydraulic circuit for a counterweight attaching/detaching device according to claim 1, further comprising:

a duct, through which the fluid in said rod chamber can be discharged into a fluid tank, with a stop valve disposed at said duct.

6. A hydraulic circuit for a counterweight attaching/detaching device according to claim 2, further comprising:

a duct, through which the fluid in said rod chamber can be discharged into a fluid tank with a stop valve disposed at said duct.

7. The hydraulic circuit for said counterweight attaching/detaching device according to claim 3, further comprising:

a duct, through which the fluid in said rod chamber can be discharged into a fluid tank with a stop valve disposed at said duct.

8. The hydraulic circuit for said counterweight attaching/detaching device according to claim 4, further comprising:

a duct, through which the fluid in said rod chamber can be discharged into a fluid tank with a stop valve disposed at said duct.

* * * * *